United States Patent [19]

Stirling

[11] Patent Number: 5,003,754
[45] Date of Patent: Apr. 2, 1991

[54] AGRICULTURAL BALE SHEATHING APPARATUS AND METHOD

[76] Inventor: William Stirling, P.O. Box 202, Lower Nicola, B.C., Canada, V0K 1Y0

[21] Appl. No.: 465,484

[22] Filed: Jan. 16, 1990

[30] Foreign Application Priority Data

Jan. 19, 1989 [CA] Canada .................................. 588681

[51] Int. Cl.$^5$ .......................... B65B 9/10; B65B 43/42
[52] U.S. Cl. ........................................ 53/459; 53/567;
      53/576; 188/4 R; 188/5; 280/475; 280/763.1
[58] Field of Search .......................... 53/459, 567, 576;
      141/114; 188/4 R, 5; 280/43.24, 475, 763.1

[56] References Cited

U.S. PATENT DOCUMENTS

| | | | |
|---|---|---|---|
| 4,594,836 | 6/1986 | Good | 53/567 X |
| 4,606,176 | 8/1986 | Cundall | 53/567 |
| 4,686,817 | 8/1987 | Brodrecht et al. | 53/567 |
| 4,888,937 | 12/1989 | Glenn | 53/567 |

FOREIGN PATENT DOCUMENTS

| | | | |
|---|---|---|---|
| WO84/02116 | 6/1984 | PCT Int'l Appl. | 53/576 |
| 2135955A | 9/1984 | United Kingdom | 53/567 |

*Primary Examiner*—John Sipos

[57] ABSTRACT

A blade sheathing device for loading bales of an agricultural product, e.g. silage, into an elongated, flexible bag, comprises a framework movable along the ground and supporting an open-ended drum that has an outer surface for supporting the bag in a compressed condition. The device has pads connected to the framework that can be lowered to a location underlying the wheels of a vehicle that is used to load a bale through the drum and into a space in the bag beyond the drum. The result is to immobilize the device during the loading operation by virtue of the weight of the vehicle on the pads. The same vehicle can be used between bale loading operations to pull the sheathing device forwards to a new location to dispense a portion of the bag from the surface of the drum and hence create a space in the bag to receive the next bale.

14 Claims, 5 Drawing Sheets

1

AGRICULTURAL BALE SHEATHING APPARATUS AND METHOD

This invention relates to a bale sheathing device and method for the loading of bales of an agricultural product, such as silage, into one or more flexible bags.

BACKGROUND OF THE INVENTION

It is known to store a series of agricultural bales end-to-end in an elongated, flexible bag of plastic. In order to insert the bales sequentially into the bag, a typical bale sheathing device consists of an open-ended drum, the outer surface of which supports the bag in a compressed condition while holding open its mouth to receive each bale. The bale is passed through the drum into the bag, after which the device is moved forwards along the ground to dispense a further length of the bag from the drum, thus preparing a new space in the bag for receipt of the next bale. The bag, and the bales that have already been inserted into it, rest on the ground. Hence, the sheathing device is made in the form of a mobile unit that can be pulled forwards along the ground after each bale has been inserted, to make space for the next bale.

Conventionally, a tractor or other powered vehicle is employed for intermittently moving the sheathing device forward and for immobilizing it during each bale loading operation. A second tractor fitted with a bale carrying spike or a similar bale supporting device is used to insert each bale through the drum into the bag. This method of operation requires two tractors or like vehicles. As an alternative, the sheathing device can be immobilized during each bale loading operation by stakes that are temporarily driven into the ground or by cables that are attached to a winch. The same winch can be used to pull the sheathing device forwards between successive bale loading operations. The use of stakes involves increased labour, plus the fact that the sheathing device has to be manhandled to its new position between each bale loading operation, while the use of a winch and cables also involves additional equipment and labour to operate it.

Prior Art

Typical such known sheathing devices are disclosed, for example, in U.S. Pat. Nos. 4,594,836 issued June 17, 1986 to D.J. Cundall; and 4,686,817 issued Aug. 18, 1987 to G.L.C. Brodrecht et al; in European patent application 0 111 434 of E. Korsgaard published June 20, 1984; and in British patent 2 135 955 A of B.M. Leedham et al published Sept. 12, 1984.

Summary of the Invention

The object of the present invention is to avoid the need for additional machinery and/or labour for immobilizing the sheathing device during a loading operation.

A further object is to provide a method whereby the bale loading operation and the temporary immobilization of the sheathing device during the bale loading operation can be carried out using a single vehicle and hence a single operator.

This result is achieved according to the present invention by employing the weight of the loading vehicle to immobilize the device during the loading operation.

To this end, the invention envisages a bale sheathing device comprising a framework movable along the ground, and an open-ended drum mounted on the framework and having a surface for supporting the flexible bag in a compressed condition. Immobilization means are connected to the framework at a location that will underlie ground engaging means, e.g. wheels or tracks, of the loading vehicle when it is in position for loading a bale through the drum and into a space in the bag beyond the drum. In this way the device is immobilized by the weight of the loading vehicle.

The invention can also be defined as a method of loading at least one bale of an agricultural product into a flexible bag, comprising holding open a mouth of the bag with a drum and loading each bale into the bag through the drum by means of a loading device mounted on a vehicle, characterised by immobilizing the drum during the loading operation by the weight of the vehicle.

Preferably, the framework also includes means for engagement by the same vehicle when the latter has been withdrawn to a position in which its ground engaging means no longer overlie the immobilization means of the device. As a result, further withdrawal of the same vehicle can pull the device forward to a new location to dispense a portion of the bag from the drum surface and form a new bale-receiving space in the bag beyond the drum.

Detailed Description of the Preferred Embodiment

Figure 1A:
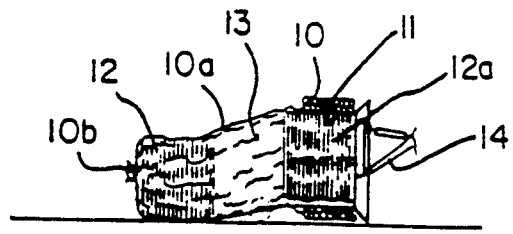
FIGS. 1a, b and c diagrammatically illustrate the basic process known in the art.
Figure 1B:
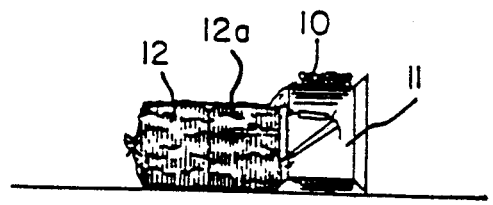
Figure 1C:
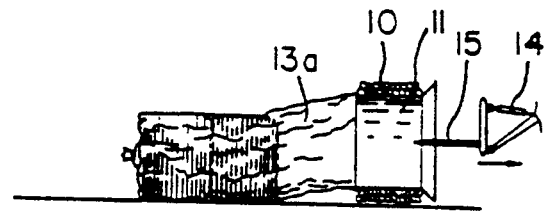

FIG. 1a shows an elongated plastic tube 10 mounted in a compressed condition on the outer surface of a cylindrical drum 11 of a bale sheathing device. A portion 10a of the tube has already been pulled off the drum 11, sealed at its end 10b to form a bag, and loaded with a first bale 12. The drum has since been moved sufficiently to the right to provide a space 13 to receive a further bale 12a which is shown in the process of being passed through the drum 11 and into the space 13 by a loading device 14. This process is shown completed in FIG. 1b. The loading device 14 is conventional and supports the bale on a spike 15. It is mounted on a tractor (not shown). After each loading operation the tractor is withdrawn and the drum 11 is moved further to the right, as shown in FIG. 1c, to dispense more of the bag from its outer surface and hence create a new space 13a for receiving yet another bale. This intermittent forward movement of the drum 11 between successive bale loading operations has been conventionally carried out by one of the means described above, at which time the loading tractor will have proceeded to an area in which further bales are located in order to pick up a fresh bale for loading next into the bag. To facilitate this forward movement of the drum along the ground, it will normally be fitted with wheels or skids (not shown). Because the drum will thus be fitted with some means for facilitating its movement along the ground, as required between bale loading operations, it is necessary during each bale loading operation to provide some means for immobilizing the drum. Otherwise the contact between the bale and the drum that takes place while the bale is being pushed through the drum (FIG. 1a) will tend to move the drum rearwards, the portion of the bag around the space 13 or 13a offering no resistance to such movement. As explained above, this temporary immobilization of the drum will normally be carried out by the same means (vehicle or winch) that is used to pull the drum forwards between bale loading operations.

Figure 2:
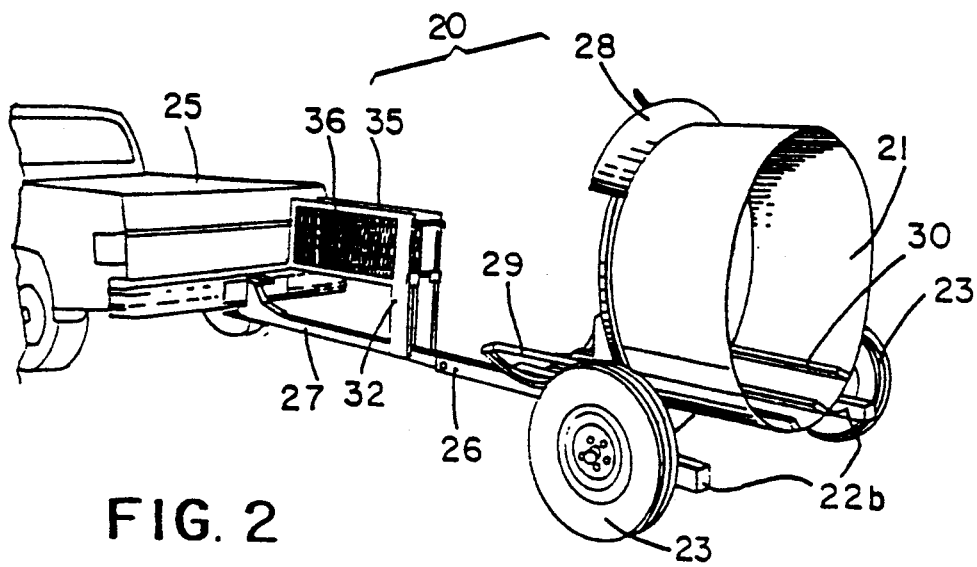
FIG. 2 is a perspective view of a bale sheathing device according to an embodiment of the present invention, shown in its travelling position for transportation to a work site.
Figure 3:
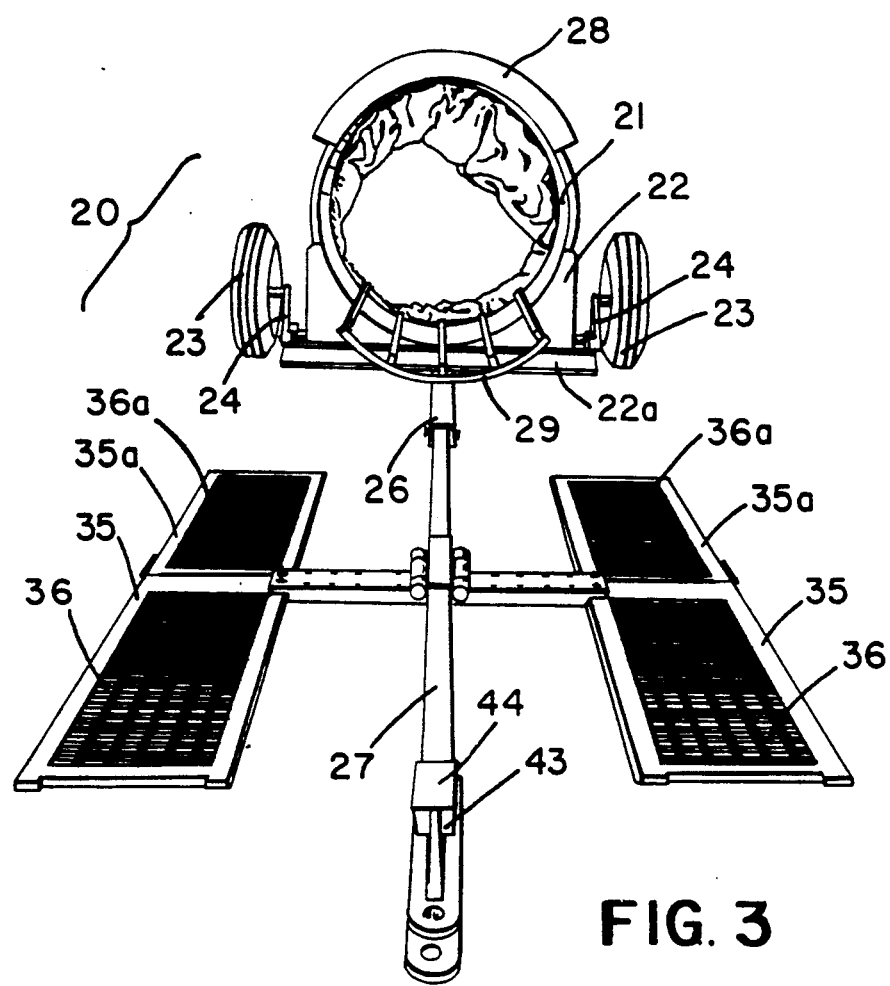
FIG. 3 is a front end view (looking rearwardly) of this device, shown in its working position.

FIGS. 2 and 3 show a bale sheathing device 20 according to a preferred embodiment of the present invention, such device 20 consisting of a drum 21 mounted on a frame 22 supported on wheels 23. The wheels 23 are connected to the frame 22 by pivotable arms 24 movable between a lowered, travelling position (FIG. 2) for transportation to a work site secured to the tow hitch of a truck 25, and a raised, working position (FIG. 3) in which, while the wheels 23 can still normally just touch the ground, so do a cross bar 22a and skids 22b forming lower portions of the frame 22. The cross-bar 22a is connected to a forwardly extending, central shaft 26 that telescopically receives a main forwardly extending shaft 27, these parts also resting on the ground when the device is in its working position. The wheel supporting arms 24 can be locked in either of their two positions by conventional means, such as bolts (not shown).

At its front end, the drum 21 has an upper cowling 28 and a lower cradle 29, both provided to help guide a bale into the drum, should such bale not be initially presented exactly coaxially with the drum by the loading vehicle. The runners 30 of the cradle 29 extend through the drum to provide further support and guidance for a bale moving therethrough.

Figure 5A:
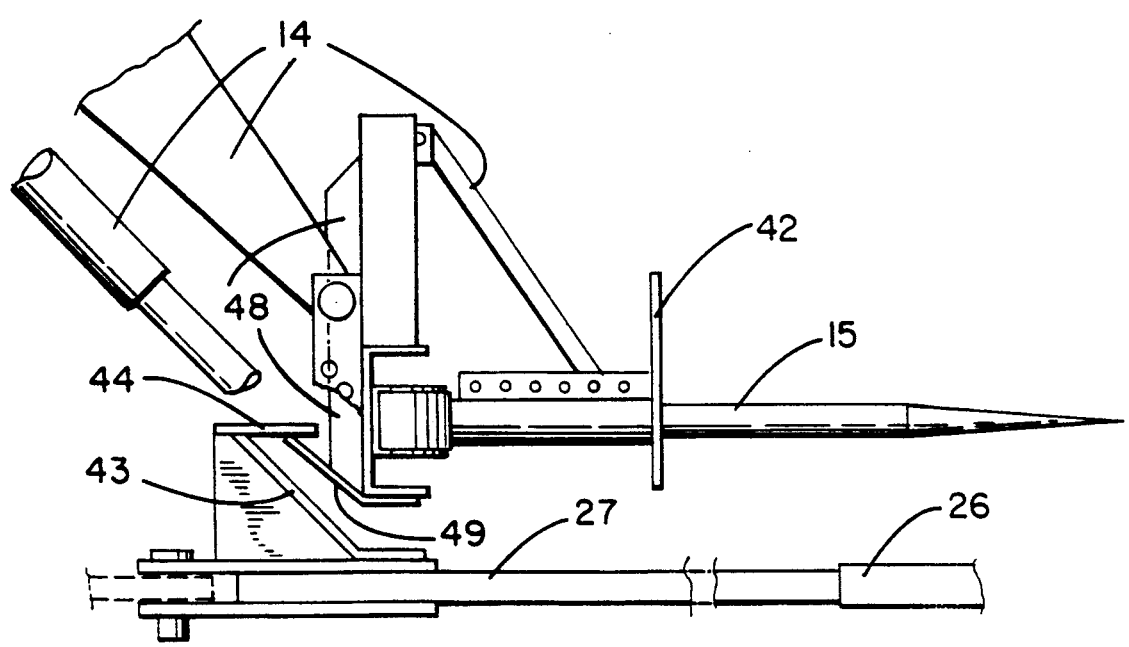
FIG. 5a is a fragmentary side view of FIG. 5.
Figure 6:
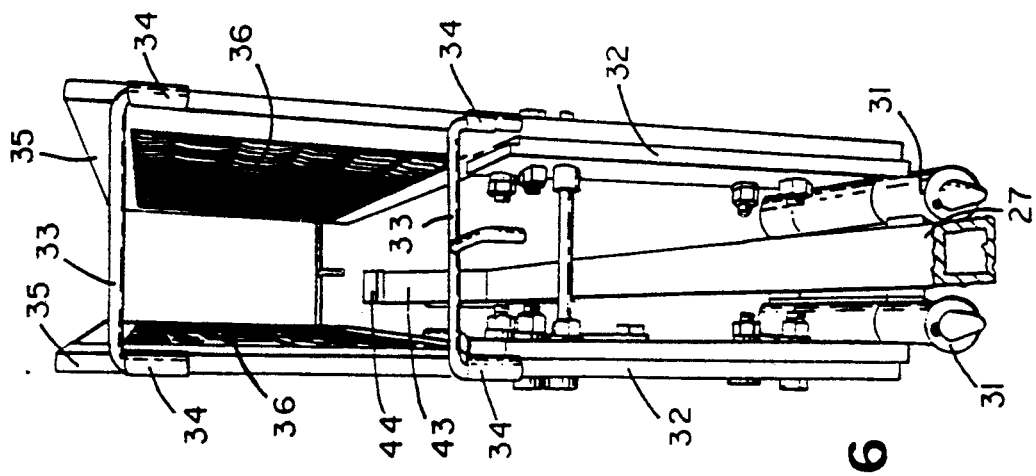
FIG. 6 is a detail of parts of the device in a travelling position.
Figure 5:
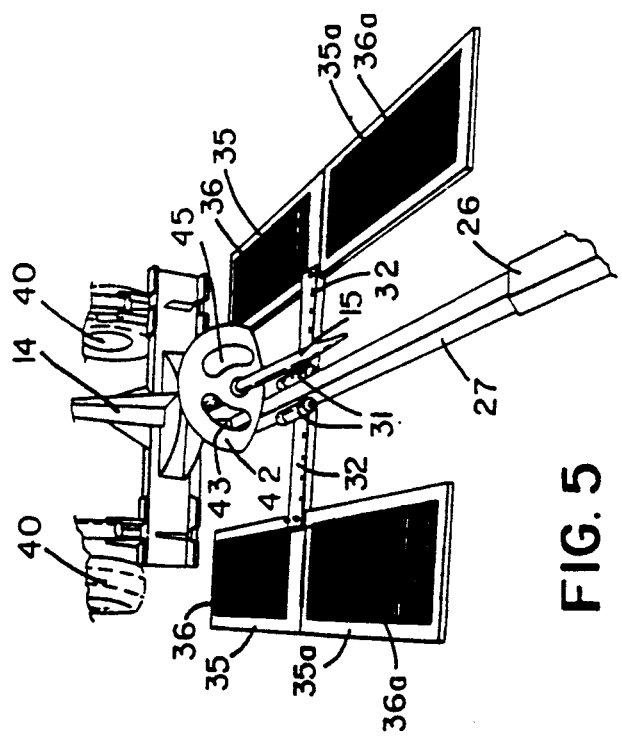
FIG. 5 is a forwardly looking, perspective view of the device, illustrating the manner in which it is drawn forwards between bale loading operations.

Referring now also to FIGS. 5 and 6, the main shaft 27 will be seen to be fitted with pivotal supports 31 for arms 32 that are thus movable between a travelling position (FIG. 6) in which they are held vertically by bent ends of rods 33 that engage in sockets 34 on the arms, and a working position (FIG. 3 or 5) in which they lie on the ground. Each arm 32 has permanently secured to it a frame 35 containing a pad 36 of strong mesh material. In addition, when the arms have been lowered to their working position by removal of the rods 33, pins on a further pair of frames 35a also containing similar pads 36a can be inserted into the sockets 34 so that such frames 35a form longitudinal extensions of the frames 35.

Figure 4:
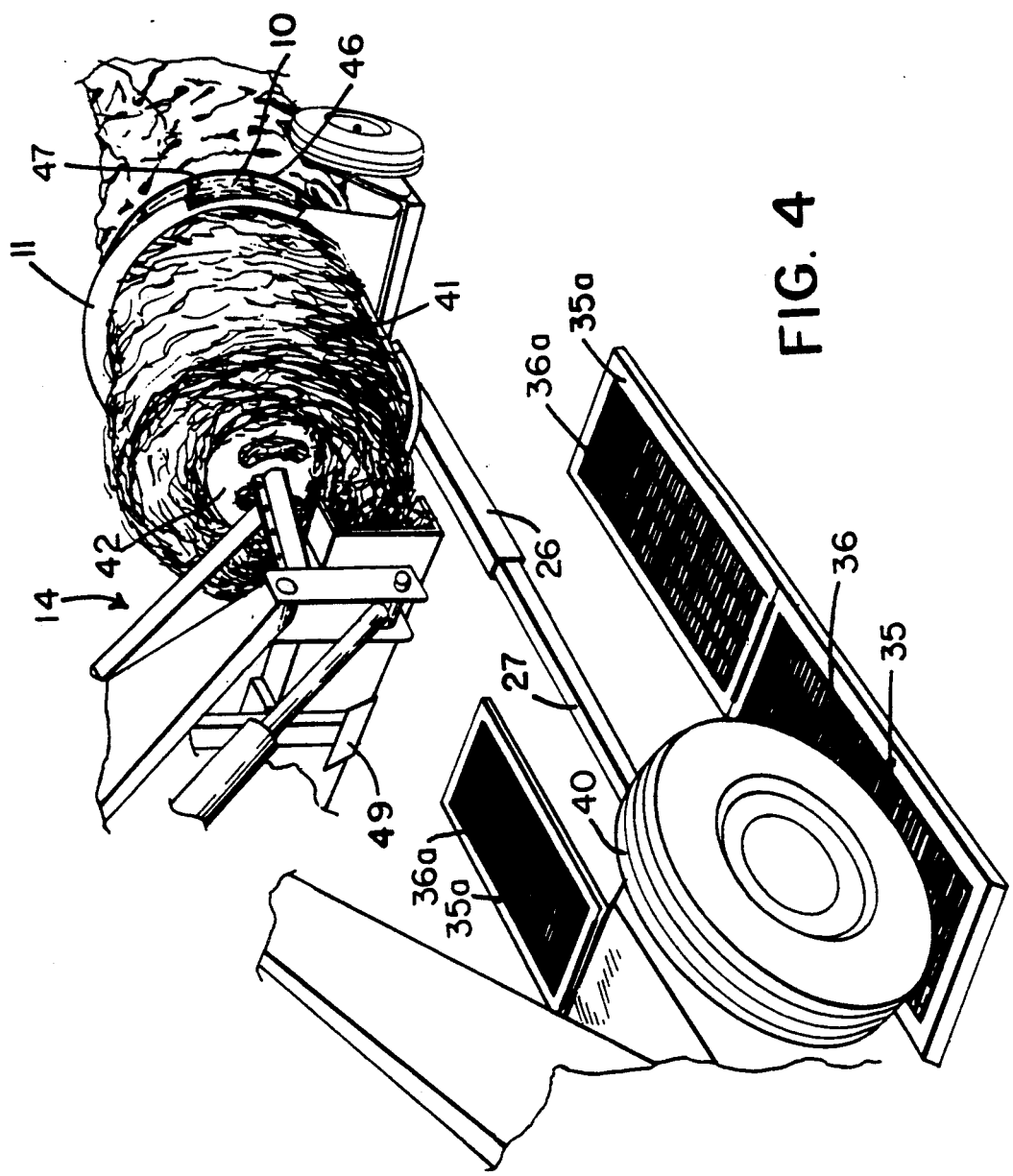
FIG. 4 is a rearwardly looking, perspective view of the device in use during a bale loading operation.

FIG. 4 illustrates a bale loading operation in which a conventional bale loading device shown generally at 14 mounted on a tractor (not otherwise shown in the drawings, except for one of its front wheels 40) is in the process of inserting a bale 41 into the drum 21 and ultimately through the same into a bag 10, the loading device having for this purpose both the spike 15 and a plate 42 with holes 45 therein. This plate 42 is a hydraulically operated push-off plate that is used in the loading process to push the bale along the spike 15 and into the bag. The front wheels 40 of the tractor rest on the pads 36 to immobilize the entire sheathing device 20. The telescopic adjustment of the shafts 26, 27 and the lengths of the frames 35, 35a will be such that these wheels 40 will begin to overlie the pads 36 just before the bale 41 touches the drum 11 and will remain on either the pads 36 or the pads 36a until the bale 41 has been fully passed through the drum and deposited on the ground beyond the drum tightly against the previously bagged bale by the action of the plate 42. The sheathing device is thus immobilized throughout the entire bale loading operation.

After the bale loading operation has been completed, the tractor is withdrawn, as shown in FIGS. 5 and 5a, so that its wheels no longer overlie the pads. An upwardly inclined plate 49 (also seen in FIG. 4) of the loading device 14 now engages under a forwardly projecting portion 44 of an upwardly projecting tongue 43 on the forward end of the main shaft 27, as best seen in FIG. 5a. As a result, continued rearward travel of the tractor will cause the plate 49 to pull the shaft 27 forwards and hence drag the entire sheathing device 20 one bale length forwards to a new location. Depending on the terrain, it will often be desirable to raise the forward end of the shaft 27 and hence the forward frames 35 slightly from the ground during this forward movement of the device to prevent the frames 35 from striking obstacles on the ground. This effect can be achieved by raising the device 14 and hence the plate 49 to raise the forward end of the shaft 27. Since the rearward frames 35a are pivotally connected to the arms 32 at their leading edges, they will normally trail loosely behind the frames 35 and readily follow any irregularities in the ground.

After this forward movement of the sheathing device 20, the tractor operator will move the tractor slightly forwards to disengage the plate 49 from the tongue 43 and leave the sheathing device in its new location, while going away to pick up another bale.

As seen in FIG. 4, the compressed portion 10 of the bag is constrained on the drum 11 by means of a retainer ring 46 that is tethered to the front edge of the drum by a series of short lengths of rope 47 that prevent the ring from being pulled rearwardly off the drum. The remote end of the bag will have been initially tethered in an appropriate manner. Also, the bag will soon become firmly held against movement along the ground by the bales that have already been loaded into it. Thus, when the sheathing device 20 is drawn forward by the tractor, the bag is drawn off the drum in a controlled manner through the limited space defined between the outer drum surface and the retainer ring 46.

It will be seen that the arrangement is such that the entire operation can be carried out by a single operator with a single vehicle, such vehicle serving the triple function of (a) picking up bales at another location, conveying them to the sheathing device and loading them into the bag;

(b) temporarily immobilizing the sheathing device during each bale loading operation; and (c) moving the sheathing device to a new position after each bale loading operation.

While the apparatus has been illustrated with round bales and hence a cylindrical drum, since this is the bale shape now most commonly employed, the invention is equally applicable to bales of other shapes, with appropriate modification, if necessary, to the cross-sectional shape of the drum and the other dimensions.

The invention has also been illustrated in connection with the storing of a series of bales end-to-end in an elongated bag. However, the invention can also be used for the insertion of a single bale into an individual bag.

Furthermore, the invention is also applicable to an arrangement in which bales are loaded into an elongated bag having a cross-sectional area large enough to accommodate a plurality of bales arranged side-by-side, for example an arrangement of the type illustrated in my prior Canadian patent application Ser. No. 520,038 filed Oct. 7, 1986 (U.S. application Ser. No. 116,062 filed Oct. 1, 1987).

The bale loading device need not necessarily be a standard tractor. It could, for example, be a vehicle mounted on endless tracks. The important consideration is that the means connected to the framework of the sheathing device, that serve for temporarily immobilizing the device, e.g. the pads, be so located as to underlie the ground engaging means of the loading vehicle throughout the loading operation, whereby to effect such immobilization by virtue of the weight of the vehicle.

What is claimed is:

1. A bale sheathing device for loading bales of an agricultural product into an elongated, flexible bag, for operating in cooperation with a loading vehicle separate from the sheating device and having ground engaging means upon which said vehicle moves, said device comprising
   (a) a framework movable along the ground;
   (b) an open-ended drum mounted on the framework and having a surface for supporting the bag in a compressed condition; and
   (c) immobilization means connected to the framework at a location that will underlie the ground engaging means of the vehicle when said vehicle is in position for loading a bale through the drum and into a space in the bag beyond the drum to immobilize the device by virtue of the weight of said vehicle.

2. A device according to claim 1, wherein the framework includes means for engagement by the vehicle when the latter has been withdrawn to a position in which its ground engaging means no longer overlie the immobilization means of the device, whereby, by further withdrawal of the vehicle, the device is moved forward to a new location to dispense a portion of the bag from the drum surface and form a new bale-receiving space in the bag beyond the drum.

3. A device according to claim 2, wherein said engagement means includes means for raising the immobilization means from the ground during the forward movement of the device.

4. A device according to claim 2, wherein said surface of the drum that supports the bag in a compressed condition is an outer surface of the drum, the device including a tethered ring surrounding said outer surface while spaced outwardly from said outer surface and located rearwardly of the compressed bag whereby to form a space between said tethered ring and the drum outer surface for controlled dispensing of the bag during the forward movement of the device.

5. A device according to claim 1, wherein said immobilization means comprise horizontal pads secured to the framework.

6. A device according to claim 1, wherein the framework includes a shaft extending forwardly from the drum, and said immobilization means comprise pads mounted on arms pivotally connected to said shaft to be movable between a working position with the arms extending horizontally and the pads lying on the ground on both sides of the shaft and a travelling position with the arms extending vertically and the pads raised from the ground.

7. A device according to claim 2, wherein said engagement means comprises an engagement member projecting upwardly from the shaft at a location forward of the arms.

8. A device according to claim 7, wherein said engagement member includes a surface for lifting by the vehicle to raise the shaft and the arms from the ground during the forward movement of the device.

9. A device according to claim 1, including wheels mounted on the framework and movable between a working position in which the framework rests on the ground and a travelling position in which the framework is elevated from the ground.

10. A device according to claim 1, wherein the drum has an inner lower surface with raised runners extending along said surface for support and guidance of a bale moving through the drum.

11. A device according to claim 10, wherein said runners extend forwardly and downwardly from a loading end of the drum to form a cradle for guiding a bale into the drum.

12. A method of loading at least one bale of an agricultural product into a flexible bag carried by a sheathing device by means of a loading vehicle separate from the sheathing device, said vehicle having a loading device and ground engaging means upon which said vehicle moves, said sheathing device comprising a drum for carrying the flexible bag and immobilizing means for immobilizing the sheathing device during loading, comprising holding open a mouth of the bag with the drum and loading each bale into the bag through the drum by means of the loading device of the loading vehicle, characterised by immobilizing the drum during the loading operation by moving the ground engaging means to overlie said immobilizing means to immobilize said sheathing device by the weight of the vehicle, while maintaining the bale movable relative to the drum for loading the bale into the bag through the drum.

13. A method according to claim 12, wherein said immobilizing means has at least one pad connected to the drum, such immobilization being achieved by causing the ground engaging means of the loading vehicle to rest on said at least one pad throughout the loading operation.

14. A method according to claim 12, including employing the loading vehicle to move the drum to a new location between successive bale loading operations.

* * * * *